US007260955B1

(12) United States Patent
Uranga (10) Patent No.: US 7,260,955 B1
(45) Date of Patent: Aug. 28, 2007

(54) PORTABLE MISTING SYSTEM

(76) Inventor: Joel Uranga, 4633 Morningstar Dr., Flower Mound, TX (US) 75028

( * ) Notice: Subject to any disclaimer, the term of this patent is extended or adjusted under 35 U.S.C. 154(b) by 446 days.

(21) Appl. No.: 10/997,185

(22) Filed: Nov. 24, 2004

(51) Int. Cl.
*F28D 5/00* (2006.01)
(52) U.S. Cl. ............................. 62/304; 62/244; 62/310
(58) Field of Classification Search .................. 62/244, 62/304, 306, 310, 314
See application file for complete search history.

(56) References Cited

U.S. PATENT DOCUMENTS

| | | | | |
|---|---|---|---|---|
| 4,930,664 | A | * | 6/1990 | Ellison ........................ 222/1 |
| 5,112,535 | A | | 5/1992 | Roberson |
| 5,478,015 | A | * | 12/1995 | Black ........................ 239/154 |
| 5,535,951 | A | | 7/1996 | Utter |
| 5,613,371 | A | | 3/1997 | Nelson |
| 5,622,056 | A | | 4/1997 | Utter |
| 5,722,596 | A | | 3/1998 | Dome |
| 5,775,590 | A | | 7/1998 | Utter |
| 6,003,786 | A | * | 12/1999 | Schwary ..................... 239/310 |
| 6,216,961 | B1 | | 4/2001 | Utter et al. |
| 6,371,388 | B2 | | 4/2002 | Utter et al. |
| 6,389,835 | B1 | | 5/2002 | Uranga |
| 6,732,951 | B1 | | 5/2004 | Salazar et al. |

* cited by examiner

*Primary Examiner*—Melvin Jones
(74) *Attorney, Agent, or Firm*—Hemingway & Hansen, LLP; D. Scott Hemingway; Malcolm W. Pipes (57) ABSTRACT

A portable misting system is disclosed for producing mist atomization in remote locations with or without pressurized water supplies. The system comprises an airtight water reservoir pressurized during filling by a pressurized water supply source. In the absence of a pressurized water supply, the system may be pressurized manually using an integrated pump.

A flexible fluid conduit constructed from interlocking segments forming resilient ball-joints connections is used to manually position a nozzle in a desired orientation. The nozzle produces an atomized mist of water that will cool the area proximate to the nozzle. Water flow thought the nozzle is controlled with a control valve coupled between the flexible fluid conduit and the nozzle proximate to the nozzle. A locking adaptor connects the flexible fluid conduit to the control valve.

20 Claims, 5 Drawing Sheets

PORTABLE MISTING SYSTEM

TECHNICAL FIELD OF THE INVENTION

A water atomization system dispensing an evaporative, cooling mist.

BACKGROUND OF THE INVENTION

Heat illness is associated with the cause of death of over 4,000 people annually in the United States. The human body operates with a core temperature between 36°-38° C. and if it is elevated, heat illness will occur. Heat illness can range from the minor (prickly heat) to the serious (heat exhaustion). Heat exhaustion can easily lead to heat stroke where a person will typically have a core body temperature of over 41° C., which can lead to death. The risk of heat illness, including heat exhaustion and heat stroke, are directly related to the temperature-humidity index. Temperatures greater than 80° F. and 80% humidity can lead to heat illness when combined with strenuous physical activity.

It is commonly known that the process of atomized water dispersed into the air provides a cooling effect. The atomization and dispersal of water into a fine mist can reduce the ambient temperature from 10° to 25° F. depending upon the relative humidity, and some outdoor misting systems claim temperature reductions of up to 35° F. In recent years, a number of water atomization or "misting" devices have been produced for pool and patio applications, restaurants, outdoor theme parks, zoos, greenhouses, and similar venues. Most of these applications utilize conventional water or plumbing lines to provide both a water source and the necessary system pressurization to create and disperse a cooling mist.

Many early atomization nozzles were actually designed for livestock and pesticide applications. This agricultural technology eventually was transferred and adopted into water atomization devices to provide a low energy cooling process for human comfort in various outdoor, non-climate controlled settings.

For many years, misting systems have been employed in outside commercial settings to provide a relatively cooler environment and continue to attract patrons even when daytime temperatures are at their highest. Mist cooling systems can be found in many patio restaurants and bars. They are a fairly standard fixture at amusement and theme parks such as the various Six Flags amusement parks, Disneyland, and Disney World. Misting systems are also seeing increasing popularity for residential use around patios in desert locations with very high temperatures and very low humidity such as Las Vegas and Phoenix, as well as other cities where high temperatures combined with medium to high humidity are common during summer months. Somewhat more sophisticated misting systems mated to a fan are used at outdoor events such as concerts and fairs.

When temperatures are high, outdoor entertainment businesses' patrons find other places to go. For example, the golfing industry suffers seasonal lows when the weather becomes hot. Conventional air-conditioning systems for golf carts and other open vehicles are impractical.

Many workers drive forklifts or otherwise engage in strenuous work outdoors. Other workers engage in strenuous work inside buildings without air conditioning systems or sufficient ventilation, such as warehouses. In addition to the inefficiencies associated with being uncomfortable while working, these workers are at risk of heat related illnesses. Misting systems attached to forklifts or other vehicles can substantially improve the attitude and productivity of the workers while reducing their exposure to the risks of heat-related illnesses. Other workers can benefit from personal, portable misting system.

Most active people also engage in physical activity outdoors lacking climate controlling air conditioning where temperatures are high enough for heat-related illness to develop. Personal, portable cooling systems also provide relief from the high heat stress these individuals can experience. Even if people are lounging in their backyard, a misting system can provide effective cooling to improve comfort.

To address the problem of heat-related discomfort and illnesses, misting devices have been developed that produce a cooling mist. Many of these misting devices are designed to be carried by hand, and lack the volume, and hands-free operation that some individuals prefer. Some designs require the introduction of pressurized air or water to provide a pressure source for forcing water through the atomization nozzles, or the device uses a battery-powered pump motor to force water through the atomization nozzle. These devices have inherent limitations as there use may be far from a pressurized water or compressed air source. Other variations require pumping air into the water reservoir to pressurize the system.

U.S. Pat. No. 5,622,056 and U.S. Pat. No. 5,535,951 disclose personalized atomization devices that are portable in nature. These devices have reservoirs divided into separate sealed sections by a flexible internal bladder, and quick-disconnect hose and nozzle couplings. These systems utilize the pressure of city water lines to fill an internal bladder while and have a secondary chamber pressurized with air that forces water out of an atomizer fitting. The disadvantages of these devices are that they incorporate the complex construction of a flexible bladder sealingly installed in a secondary containment reservoir and lack an effective distribution system for many activities.

U.S. Pat. No. 5,620,140 and U.S. Pat. No. 5,775,590 disclose a personal, portable cooling device utilizing a manual pumping chamber to achieve water atomization and provides for conductive cooling in addition to convective cooling, and allows for remote system pressurization. The disadvantages of this and similar devices are that they require separate operational steps to fill the reservoir and to compress the air in the reservoir and require the user to compress air in the reservoir and must do so by continuously pumping air into the reservoir by hand.

U.S. Pat. No. 6,371,388 and U.S. Pat. No. 6,216,961 disclose a misting device that includes an air flow directed toward a user. U.S. Pat. No. 6,371,388 claims a cylindrical misting device delivering a high velocity, laminar air flow with an atomizing nozzle discharging a mist into the air flow from a pressurized water tank. U.S. Pat. No. 6,216,961 claims a waist pack misting device delivering a 17 mph air flow at 18 inches from a fan directed toward a user's face with an atomizing nozzle discharging a mist into the air flow from a spray bottle. Both devices are designed to take advantage of the wind chill effect that occurs when air blows across a person's bare skin.

U.S. Pat. No. 5,613,371 discloses a system for providing water mist to the occupants of open vehicles such as golf carts. This system utilizes the power system of the vehicle to electrically pump water to atomizing nozzles. The system requires a relatively elaborate design of equipment, including an electrical water pump, accumulator, fuses, on/off switches, and a separate water tank. The disadvantages of these devices are that they are expensive, complex, and require electrical power to operate. Power supplied to accessory systems from electric carts is undesirable since it reduces the duration for which the vehicle can operate.

There is a need for a misting device that can passively produce a cooling mist that does not require an external pressurization or power source. Such a device would gain benefits of simplicity of design, use, and production. Such a device would not require any additional steps for use beyond filling the device with water.

SUMMARY OF THE INVENTION

The invention is an airtight reservoir with an quick-disconnect valve for filling the reservoir with water. A flexible fluid conduit constructed of pressure-fitted interlocking ball-joints is connected to the reservoir by an inlet end. The outlet end is coupled to a control valve by a snap fitting adaptor. The control valve is proximately connected to a nozzle.

In operation, water under pressure in the reservoir flows through the nozzle in an atomized mist when the control valve is open. The flexible fluid conduit is manually adjusted to a preferred orientation to dispense the cooling mist in a desired orientation. As water exits the reservoir, the pressure decreases. An integral pump can be used to repressurize the reservoir during use, or the reservoir can be left connected to a water sources that maintains the pressure during operation.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
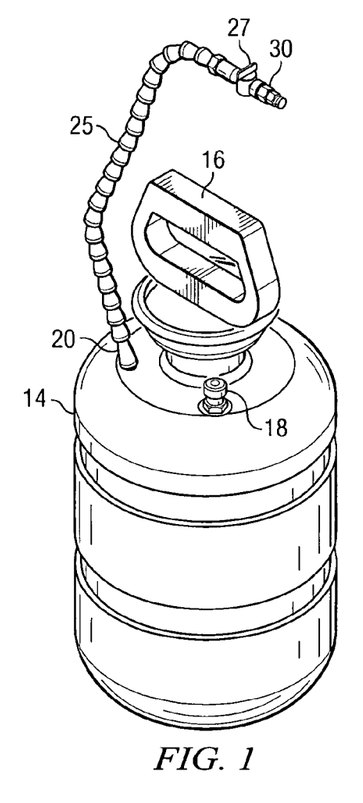
FIG. 1 is an isometric view of the invention of a preferred embodiment of the present invention.

FIG. 1 shows the primary components of a preferred embodiment of the misting system of the present invention. An airtight reservoir 14 has a quick-disconnect valve 18 on the top surface of the reservoir 14. An integral manual air pump 16 can be used to force air into the reservoir 14 and pressurize the interior. A reservoir connection 20 includes one-way valve that allows fluid to flow out of the reservoir 14 but will not allow fluid to flow back into the reservoir 14. A flexible fluid conduit 25 connects a valve 27 to the reservoir 14. The valve 27 controls fluid flow out of a nozzle assembly 30 that is coupled to the flexible fluid conduit 25.

Figure 2:
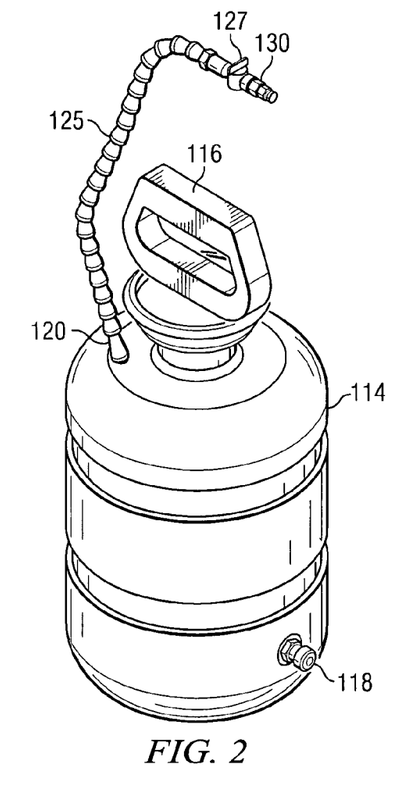
FIG. 2 is an isometric view of the invention of a second preferred embodiment of the present invention.

FIG. 2 shows an alternate preferred embodiment. An airtight reservoir 114 has a quick-disconnect valve 118 on the bottom side surface of the reservoir 114. An integral manual air pump 116 can be used to force air into the reservoir 114 and pressurize the interior. A reservoir connection 120 includes one-way valve that allows fluid to flow out of the reservoir 114 but will not allow fluid to flow back into the reservoir 114. A flexible fluid conduit 125 connects a valve 127 to the reservoir 114. The valve 127 controls fluid flow out of a nozzle assembly 130 that is coupled to the flexible fluid conduit 125.

Figure 3:
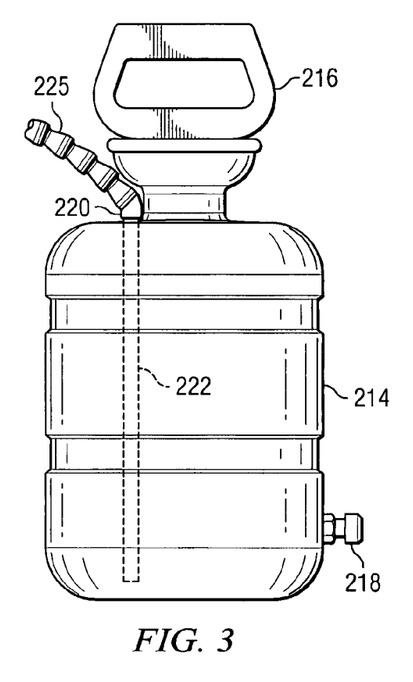
FIG. 3 is a view of the reservoir used in the invention.
Figure 4:
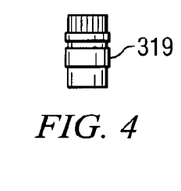
FIG. 4 is an isometric view of the female quick-disconnect coupling for threaded connection to a garden hose or other pressurized water supply source, which permits quick, sealed connection of the water supply source to the reservoir.

FIG. 3 is isometric view of the reservoir component of the preferred embodiment of the present invention. A reservoir connection 220 is connected near to an inlet 222 (hidden lines) of flexible fluid conduit 225. Inlet 222 of the flexible fluid conduit 225 is located inside and extends down to near the bottom of reservoir 214. A quick-disconnect valve 218 located near the bottom of the reservoir 214 that can be used to fill the reservoir 214 with water or other fluid. Referring to FIG. 4, a complementary coupling 319 is provided for a threaded connection to a garden hose or other pressurized fluid supply source, and the coupling 319 will fit over the quick-disconnect valve 218. The quick-disconnect valve 218 is a one-way valve that provides a water and airtight seal when the coupling 219 is not attached. An integral manual air pump 216 can be used to force air into the reservoir 214 and pressurize the interior.

Figure 5:
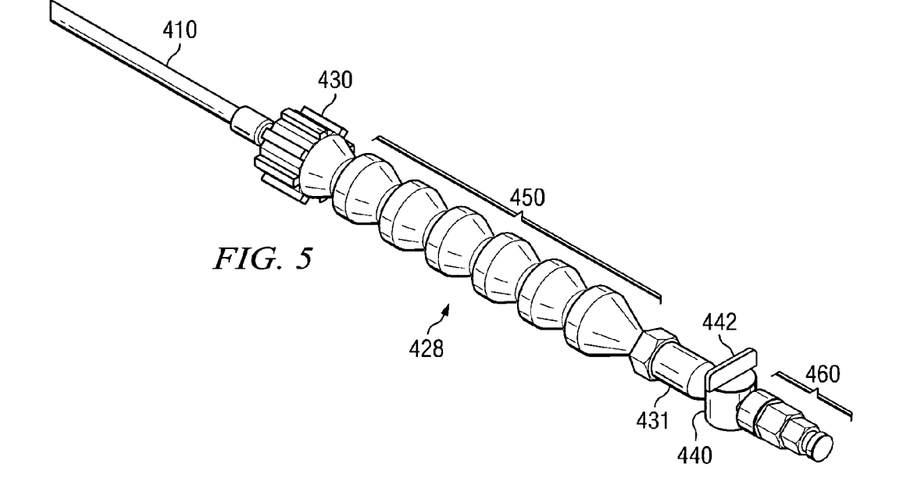
FIG. 5 is a side view of the flexible fluid conduit used in invention.
Figure 6:
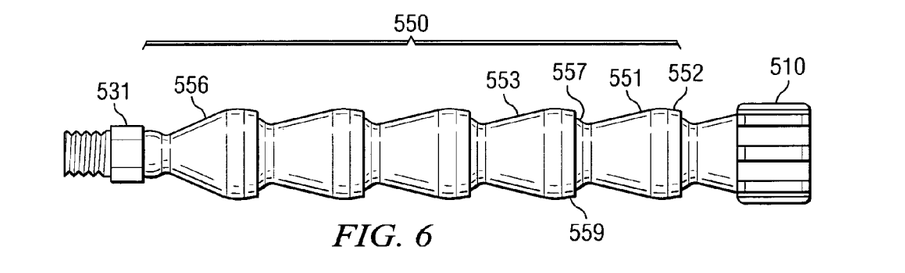
FIG. 6 is a side view of the body of the flexible fluid conduit showing the interlocking segments and the adaptors on either end as shown in FIG. 5.
Figure 7:
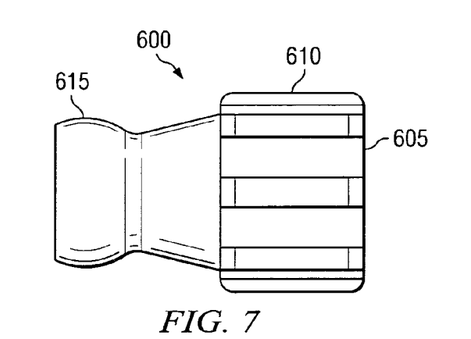
FIG. 7 is a side view of the threaded adaptor coupling that connects the flexible fluid conduit to the reservoir.
Figure 8:
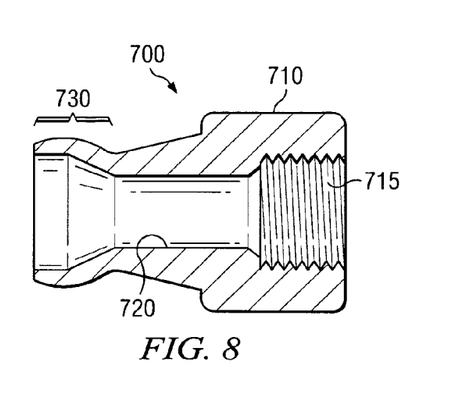
FIG. 8 is mid-line sectional view of the threaded adaptor coupling.
Figure 9:
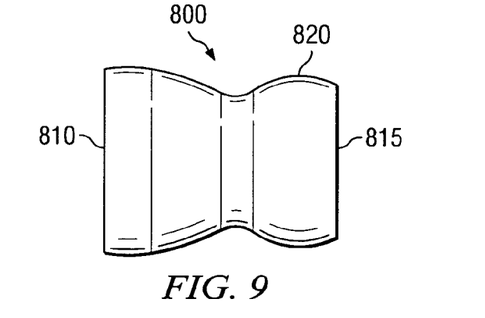
FIG. 9 is a side view of a plastic ball-joint segment.
Figure 10:
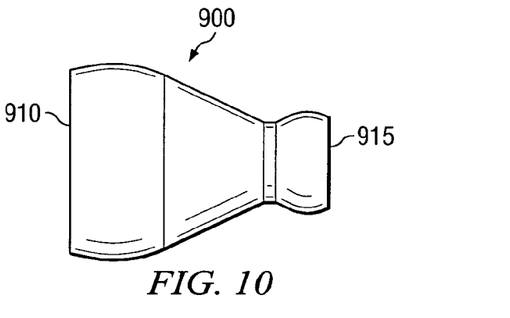
FIG. 10 is a side view of a ½" to ¼" adaptor ball-joint segment adaptor used to connect the flexible fluid conduit to the control valve.
Figure 11:
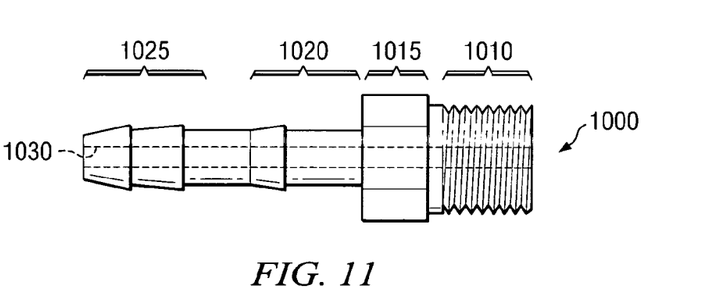
FIG. 11 is side view of snap fitting internal tube adaptor used to connect the tubing of the flexible fluid conduit to the control valve.
Figure 12A:
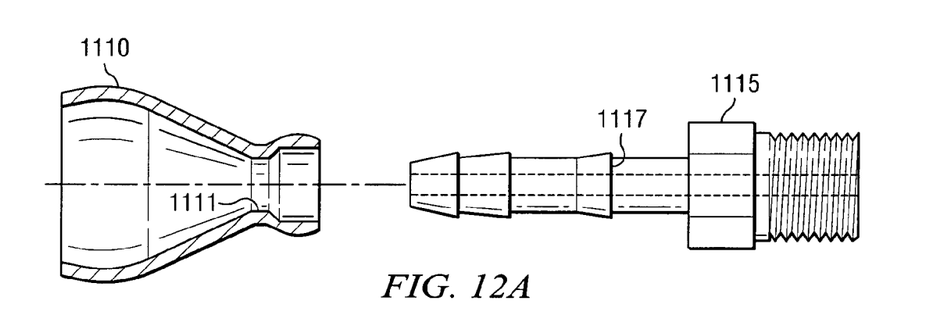
FIG. 12 is a cross-section view of the ball-joint segment adaptor and snap fitting internal tube adaptor and how the two parts couple together.
Figure 12B:
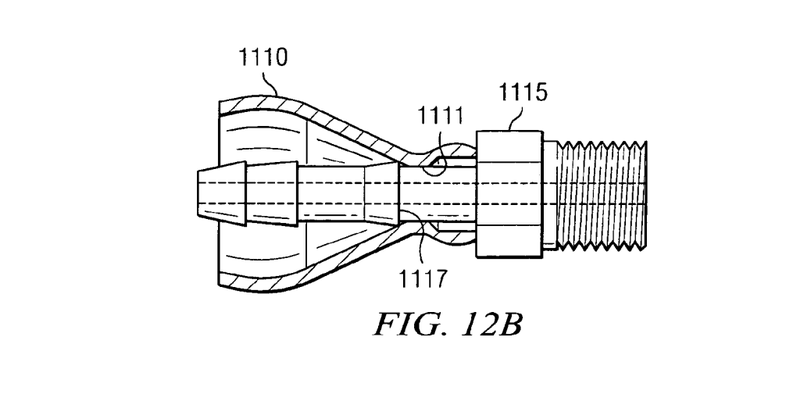
Figure 13:
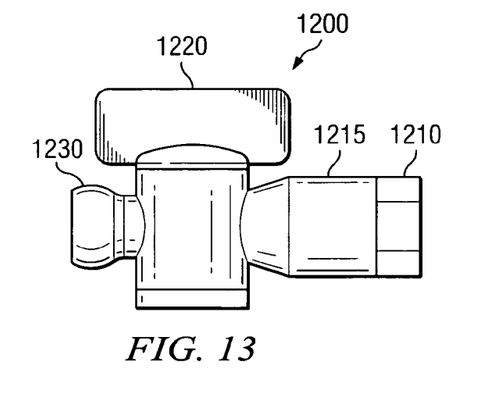
FIG. 13 is a side view of the control valve.
Figure 14:
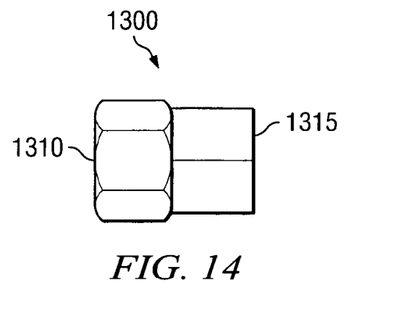
FIG. 14 is a side view of the ¼" to ⅛" socket adaptor used to connect the control valve to the nozzle assembly.

FIG. 5 is a perspective view of the flexible fluid conduit, valve, and nozzle assembly. In the preferred embodiment, the flexible fluid conduit 428 has an outside diameter of approximately one inch. The first end of the flexible fluid conduit 428 is a threaded adaptor coupling 430 for connecting the flexible conduit 420 to the reservoir connection (20, 120, and 220). Extending from the end of coupling 420 is the core plastic tubing 410 that fluid flows through. When the threaded coupling 430 is screwed over the reservoir connection, the core plastic tubing 410 couples to a one-way valve in the reservoir connection to form a water and air tight seal with the plastic tubing 410 that extends down into the reservoir (14, 114, 214).

The core plastic tubing 410 passes through the length of the flexible fluid conduit. A threaded adaptor coupling 430 connects to a length of interlocking plastic ball-joint segments 450 that tightly fit together to form the length of fluid conduit 428 that can be manually manipulated to a desired configuration. The interlocking plastic ball-joint segments 450 pressure fit together so as to retain their relative position with each other once manipulated into the desired shape and configuration. The flexible, resilient memory-retaining components can be manipulated to a desired configuration to dispense a mist in a desired orientation.

A snap fitting internal tube adaptor 431 couples the core plastic tubing 410 and interlocking plastic ball-joint segments 450 to a control valve 440. The control valve 440 has a flow selector 442 that can be rotated to an on position permitting fluid flow and an off position blocking fluid flow. A nozzle assembly 460 couples to the control valve 440.

Although the preferred embodiment uses segments of interlocking ball-joint segments, it is readily apparent that other flexible tube configurations are possible. The salient feature of the flexible conduit is a configuration that can manually be manipulated into a preferred configuration that retains the desired, manipulated configuration.

FIG. 6 shows additional details of the flexible fluid conduit. Loc-Line® interlocking plastic ball-joint segments. The exterior body of the flexible fluid conduit is a series of interlocking plastic ball-joint segments 550. The threaded adaptor coupling 510 pressure-fits into the first end 552 of the first plastic ball-joint segment 551. The second end 557 of the first plastic ball-joint segment 551 in turn fits into the first end 559 of the second plastic ball-joint segment 553. The total length of the interlocking plastic ball-joint segments 550 in the preferred embodiment is between 12" to 18". The terminating end of interlocking plastic ball-joint segments 550 is a plastic ball-joint segment adaptor 556 that a snap fitting internal tube adaptor 531 fits into.

FIG. 7 shows additional detail of the threaded adaptor coupling. The body of the threaded adaptor coupling 600 is preferably constructed of plastic. The first end 605 threadedly couples to the reservoir connection (20, 120, 220) to form a water and air tight connection. The exterior of the threaded adaptor coupling 600 includes ridges 605 so that a user can tighten, or loosen, the threaded adaptor coupling 600 to the reservoir connection (20, 120, 220). The second end consist of a ball section 615 that pressure fits into the plastic ball-joint segments to form the first ball-joint connection.

FIG. 8 is a mid-line sectional view of the threaded adaptor coupling. The threaded adaptor coupling 700 has an exterior with the ridges 710 for gripping. The threaded interface 715 fits over the threaded section of the reservoir connection (20, 120, 220). The cylindrical center 720 permits passing hollow plastic tubing through so fluid can flow from the pressurized interior of the reservoir (14, 114, 214) to exit from the nozzle assembly (30, 130, 460).

FIG. 9 shows additional detail of a plastic ball-joint segment. The plastic ball-joint segment 800 has a female first end 810 and a male second end 815. The design of the semispherical ball section 820 pressure fits into the female end 810 of a corresponding segment. The semispherical ball section 820 rotates within the female end 810 segment to form a resiliently flexible length memory-retaining segments that can be rotatably manipulated into a variety of configurations.

FIG. 10 shows additional detail of the ball-joint segment adaptor. This ball-joint segment adaptor 900 is a ½" to ¼" adaptor. The female first end 910 of the ball-joint segment adaptor 900 couples to the male second end of a ball-joint segment. The diameter of the opening into female first end 910 is approximately ½". The second end 915 of the ball-joint segment adaptor 900 is approximately ¼" so the adaptor reduces the opening from ½" to ¼".

FIG. 11 shows additional detail of the snap fitting internal tube adaptor. The snap fitting internal tube adaptor 1000 consist of five structural elements. The first element is the threaded exterior section 1010 that screws into a control valve. The second element is a hexagonal nut fastener section 1015 that allows tools to attach to the snap fitting internal tube adaptor 1000 for assembly. The third element 1020 locks onto the ball-joint segment adaptor 900. The fourth element 1025 allows the tubing that fluid flows through to securely friction fit onto the snap fitting internal tube adaptor 1000. Finally, the snap fitting internal tube adaptor 1000 has an orifice approximately 0.20" that passes completely through the snap fitting internal tube adaptor 1000.

FIG. 12 is a cross-section view of the ball-joint segment adaptor and snap fitting internal tube adaptor and how the two parts couple together. The ball-joint segment adaptor 1110 includes an internal lip structure 1111, while the snap fitting internal tube adaptor 1115 includes a ring fitting 1117. The snap fitting internal tube adaptor 1115 slides into the ball-joint segment adaptor 1110 as shown, so that the ring fitting 1117 "snaps" over the lip structure 1111 to lock the two components together in the final, assembled configuration.

FIG. 13 shows the control valve that the internal tube adaptor attaches to. The control valve connects to the exposed threads 1010 of the snap fitting internal tube adaptor 1000 using a hexagonal coupler 1210 with matching internal threads. The hexagonal coupler 1210 is friction fitted or glued into the female end 1215 of the control valve 1200. A valve stem 1220 passes through the body of the control valve 1200 and turns to selectively allow fluid flow through the valve 1200. The male end 1230 of the control valve 1200 pressure fits into a corresponding female end of a ¼" to ⅛" socket adaptor.

FIG. 14 shows the ¼" to ⅛" socket adaptor. The female first end 1310 of the ¼" to ⅛" socket adaptor 1300 pressure fits over the male end 1230 of the control valve 1200. The second end 1315 of the ¼" to ⅛" socket adaptor 1300 is internally threaded to couple with the nozzle assembly.

FIG. 15 is an exploded isometric view of the nozzle assembly of a preferred embodiment of the present invention. In this view, a threaded end element 1446 threadedly connects to the ¼" to ⅛" socket adaptor 1300. A filter element 1458 is inserted into end element 1446 located between a receptacle 1456, with the end element 1446 and the receptacle 1456 threadedly coupled together. A nozzle 1560 is threadedly connected to the 1456. Preferably, nozzle 1460 has a flow rating of at least 0.75 gallons per hour. An o-ring seal 1462 seals the connection between nozzle 1460 and receptacle 1456.

Figure 16:
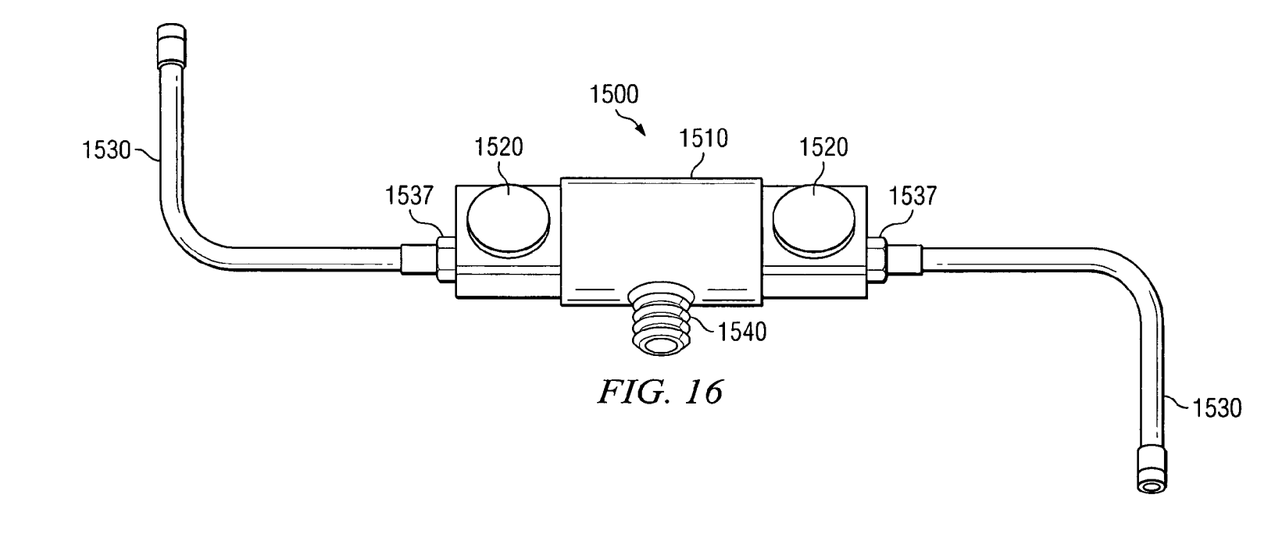
FIG. 16 is an alternative embodiment for a manifold with two flexible nozzle assemblies attached to the ball-joint segment.
Figure 17:
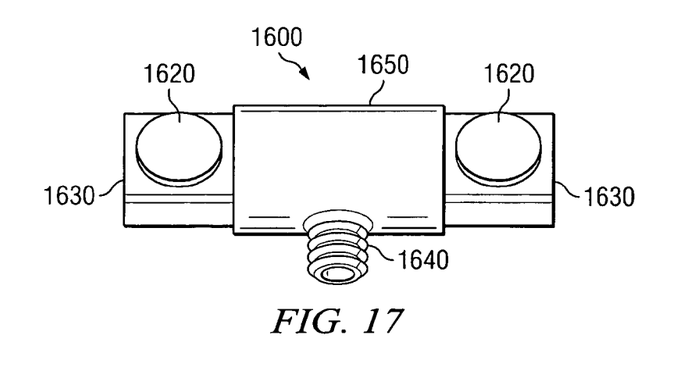
FIG. 17 is a cutaway view of the manifold.

FIG. 16 is an alternative embodiment that uses a manifold with two flexible nozzle assemblies. The manifold 1500 consist of an elongated, rectangular housing 1510. A valve control 1520 on each end of the housing 1510 controls water flow through the manifold 1500 and out of the nozzle assembly 1530. The nozzle assembly 1530 screws onto the manifold 1500 by two plastic fittings 1537. A threaded coupling 1540 is provided to screw onto an appropriate adaptor on the end of the plastic ball-joint segment 800.

FIG. 17 shows a cutaway view of the manifold body to reveal the internal structure. The threaded coupling 1640 terminates inside the manifold 1600 to form a T-junction in a tube 1650. On either end of the tube 1650 a control valve 1620 controls water flow through the manifold 1600. The tube 1650 terminates at each end in a female receptacle 1630 to connect the nozzle assembly to the manifold 1600.

Figure 18:
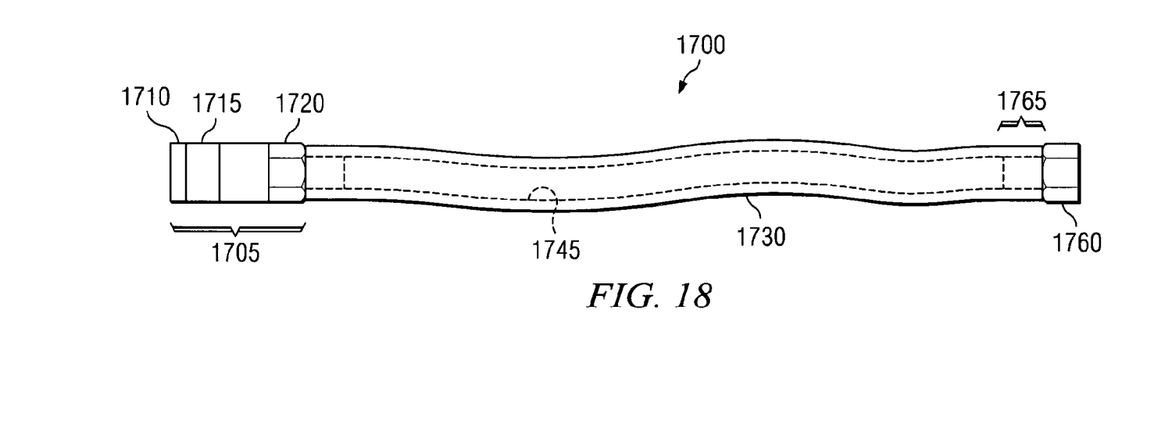
FIG. 18 is a view of a nozzle assembly in the alternate embodiment.

FIG. 18 shows a cutaway view of a nozzle assembly used in the alternative embodiment. A plastic male coupling 1705 forms one end of the nozzle assembly 1700 to connect to the female receptacle 1630 of the manifold 1600. The male coupling 1705 includes a neoprene or rubber o-ring 1710 that forms a water tight seal when connected to the manifold 1600. A threaded section, tongue and groove, or similar type connection means 1715 securely couples the nozzle assembly to the manifold 1600. A nipple 1720 slides into the tube to form a water tight seal. Copper (or some similar bendable metal) wire 1745 slides into the opening of the nipple 1720. The opening of the nipple 1720 is not circular, but rather forms a roughly triangular, rectangular, or similar shaped opening so that the metal wire fits down inside the coupling 1705 flush to a side so as to not form a stress spot that the end of the wire 1745 can cut into as the nozzle assembly is bent to a desired configuration.

The wire 1745 running the length of the nozzle assembly 1700 give the tube 1730 rigidity so that the nozzle assembly 1700 can be bent to a desired orientation. The nozzle 1760 includes a nipple section 1765 that slides into the tube 1730 to friction fit in a water tight seal. The end of the wire 1745 running the length of the nozzle assembly 1700 is cut and crimped to form a flattened cross section fitting into the nozzle 1760 so no water tight seal is possible. Water can thus flow through the polygonal shaped opening of the male coupling 1705 down the length of the tube 1730 and over the surface of the wire 1745 and out of the nozzle 1765. The two nozzle assemblies can be bent and adjusted to a desired orientation in concert with the ball-joint segment to deliver a cooling mist.

OPERATION

Referring to FIGS. 2, 3 and FIG. 4, complementary coupling 319 is threadedly connected to the end of a garden hose for easy attachment and release to quick-disconnect valve 118 and 218. Quick-disconnect valve 118 and 218 is connected to reservoir 114 and 214. To fill reservoir 114 and 214 with water for service, a garden hose fitted with coupling 319 is connected to quick-disconnect valve 118 and 218. When the water is turned on, it flows past valve 118 and 218 into reservoir 114 and 218. The quick-disconnect valve 118 and 218 is a one-way valve, which prevents the escape of air pressure and water from reservoir 114 and 214. The misting system is a closed system (water and air-tight), so the addition of water into reservoir 114 and 214 at the pressure of the supply source (i.e., city water line pressure) increasingly compresses the air in reservoir 114 and 214 as it fills with water if the control valve 27 and 127 closed. Thus, as water enters reservoir 114 and 214, the internal air pressure inside reservoir 114 and 214 exceeds the ambient air pressure outside.

Conduit inlet 222 of the flexible tubular fluid conduit 225 extends downward inside reservoir 214 to near the bottom of reservoir 214. It is at the open end of conduit inlet 222 that water enters the flexible tublular conduit 225 under pressure. Conduit inlet 222 is plumbingly connected to the flexible tubular fluid conduit 225. Referring to FIG. 5, the flexible tubular fluid conduit 428 is plumbingly connected to the reservoir connection 120 and 220 by the threaded adaptor coupling 430. The control valve 440 can be opened or closed for controlling the flow of water from the reservoir 114 and 214.

Referring to FIG. 1 and FIG. 2, the control valve 27 and 127 is closed when filling reservoir 14 and 114 from a water hose through quick-disconnect valve 18 and 118 and pressurizing the misting system. Control valve 27 and 127 is opened to start the flow of water through the misting system. When control valve 27 and 127 is opened, the pressurized air in reservoir 14 and 114 forces water to travel sequentially through conduit inlet 222, through flexible fluid conduit 25 and 125, past the control valve 27 and 127, and through the nozzle assembly 30 and 130 to dispense as a cooling mist.

As reservoir 14 and 14 loses water through misting, the volume of air space inside reservoir 14 and 114 increases, proportionally decreasing the air pressure inside of reservoir 14 and 114. Since air pressure provides the energy source for forcing water through the misting system, it may eventually be necessary to increase the air pressure inside of reservoir 14 and 114 to continue misting. The system can be recharged by reconnecting a garden hose to quick-disconnect valve 18 and 118 and refilling the reservoir 14 and 114 with water to repressurize the system to force water through the system and replenish the water supply. The system can also be recharged to increase the air pressure using the manual pump handle 16 and 116 to force air into the reservoir 14 and 114. The embodiment of FIG. 2 is further intended to offer the option of leaving a garden hose connected to the quick-disconnect valve 118 so as to constantly refresh the water and maintain the pressure inside the reservoir 114.

Figure 15:
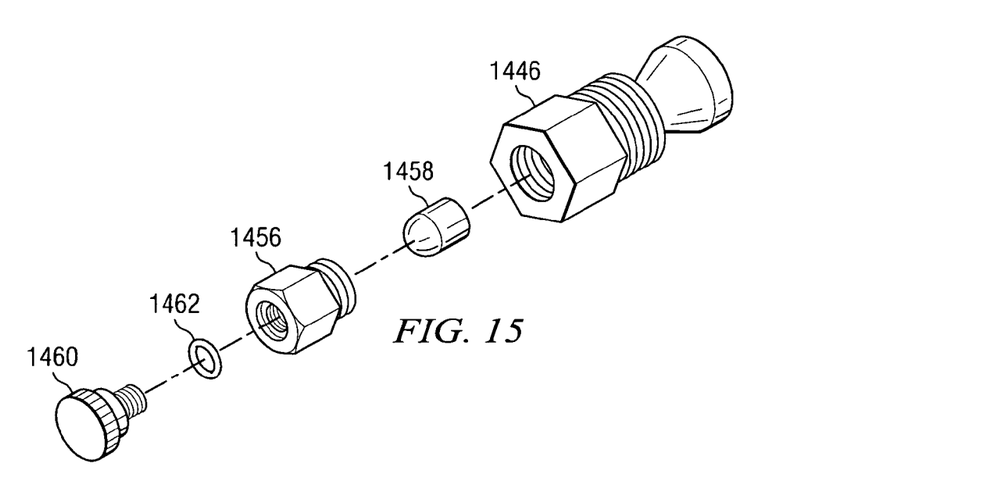
FIG. 15 is an exploded isometric view of the nozzle assembly used in the preferred embodiment.

Referring to FIG. 15, the filter element 1658 located between receptacle 1456 and end element 1446 prevents impurities from flowing into the nozzle 1460 that otherwise would clog nozzle 1460. The o-ring seal 1462 helps seal the connection between nozzle 1660 and receptacle 1454.

While the invention has been particularly shown and described with respect to preferred embodiments, it will be readily understood that minor changes in the details of the invention may be made without departing from the spirit of the invention. Having described the invention,

I claim:

1. A misting system for dispensing a cooling mist comprising:
    an air-tight fluid reservoir;
    a valve connected to the reservoir for coupling a supply conduit to the reservoir;
    a flexible elongated body member conduit having an inlet end coupled to the reservoir, a mid-section assembly with an internal conduit and an outlet end for delivering pressurized fluid from the flexible member to a nozzle assembly, said mid-section assembly having a series of ball and socket connection elements;
    a valve connected to the outlet end of the elongated body member has a regulator to variably restrict the flow of pressurized fluid from the nozzle assembly; and
    said flexible elongated body member can be manually adjusted to maintain a desired orientation and shape.

2. The misting system for dispensing a cooling mist of claim 1 wherein the valve attached to the reservoir operates to permit fluid flow only into the reservoir.

3. The misting system for dispensing a cooling mist of claim 2 wherein a garden hose with an attached adaptor couples to the valve to fill the reservoir with liquid.

4. The misting system for dispensing a cooling mist of claim 1 wherein the flexible fluid conduit is comprised of a plurality of resiliently manipulated interconnected segments that include pressure fitted flexible memory-retaining components connected in a ball-joint configuration to each rotate within the ball-joint connection.

5. The misting system for dispensing a cooling mist of claim 1 wherein the flexible fluid conduit includes an internal tube adaptor coupling flexible tubing to the nozzle assembly that locks onto the flexible fluid conduit.

6. The misting system for dispensing a cooling mist of claim 1 wherein internal pressure inside the reservoir forces fluid through the nozzle under the pressure.

7. The misting system for dispensing a cooling mist of claim 6 wherein internal pressure inside the reservoir forces results from water entering the reservoir through the quick-disconnect valve.

8. The misting system for dispensing a cooling mist of claim 6 wherein internal pressure inside the reservoir forces results from air manually pumped into the reservoir using an integrated manually operated pump.

9. A misting system for dispensing a cooling mist comprising:

an air-tight fluid reservoir filled with liquid;

a valve attached to the reservoir for filling the reservoir with liquid, said valve having a quick disconnect component;

a flexible elongated body member having an inlet end coupled to the reservoir, a midsection assembly with an internal conduit, and an outlet end coupled to a nozzle assembly using an adaptor secured by a locking action to the flexible member, said nozzle assembly able to dispense a cooling mist of water and said midsection assembly being a semi rigid rod structure manually adjustable to maintain a desired orientation and shape; and a valve associated with the nozzle assembly to regulate water flow from the reservoir through the nozzle assembly.

10. The misting system for dispensing a cooling mist of claim 9 wherein the one-way valve is attached proximate to the bottom of the reservoir.

11. The misting system for dispensing a cooling mist of claim 10 wherein the flexible fluid conduit includes interlocking segments pressure-fitted together to form one or more ball-joint connections, said interlocking segments rotatable at the ball-joint.

12. The misting system for dispensing a cooling mist of claim 10 wherein internal pressure inside the reservoir forces liquid through the nozzle under the pressure.

13. The misting system for dispensing a cooling mist of claim 12 wherein internal pressure inside the reservoir forces results from liquid entering the reservoir through the one-way valve.

14. The misting system for dispensing a cooling mist of claim 12 wherein internal pressure inside the reservoir forces results from air manually pumped into the reservoir using an integrated manually operated pump.

15. A method for cooling an area comprising the steps of:

providing an air-tight fluid reservoir filled with liquid using a one-way valve attached to the reservoir and pressurizing the interior of the reservoir;

attaching a flexible conduit comprising interlocking pressure fitted segments to the reservoir by an inlet end with a tube extending into the reservoir and coupling a nozzle assembly to the outlet end using an adaptor that locks to the outlet end;

controlling liquid flow from the reservoir through the nozzle assembly using a control valve; and dispensing liquid flowing through a nozzle assembly to produce a liquid mist that cools a desired area.

16. The method for cooling an area of claim 15 further comprising the steps of:

constructing the flexible fluid conduit of tubing passing through interlocking pressure fitted segments that form a plurality of rotatable ball-joint connections between the inlet end and the outlet end.

17. The method for cooling an area of claim 15 further comprising the step of:

adjusting the flexible conduit to desired orientation and shape to dispense a liquid mist in a desired orientation.

18. The method for cooling an area of claim 15 wherein the length of the flexible conduit is between 12" and 18" long.

19. The method for cooling an area of claim 15 wherein the nozzle has a rated liquid flow rate of at least 0.75 gallons per hour.

20. The method for cooling an area of claim 15 further comprising the steps of:

providing a manual pump on the reservoir that can be used to increase the internal pressure inside the reservoir;

pressurizing the interior of the reservoir by filling the reservoir with liquid; and pressurizing the interior of the reservoir using the manual pump.

* * * * *